(12) United States Patent
Masclaux

(10) Patent No.: US 8,936,286 B2
(45) Date of Patent: Jan. 20, 2015

(54) DEVICE AND METHOD FOR HANDLING AN UNCURED TIRE BLANK

(75) Inventor: Christophe Masclaux, Clermont-Ferrand Cedex (FR)

(73) Assignees: Compagnie Generale des Etablissements Michelin, Clermont-Ferrand (FR); Michelin Recherche Techniques S.A., Granges-Paccot (CH)

( * ) Notice: Subject to any disclaimer, the term of this patent is extended or adjusted under 35 U.S.C. 154(b) by 28 days.

(21) Appl. No.: 13/641,382

(22) PCT Filed: Apr. 12, 2011

(86) PCT No.: PCT/FR2011/050841
§ 371 (c)(1),
(2), (4) Date: Apr. 22, 2013

(87) PCT Pub. No.: WO2011/128584
PCT Pub. Date: Oct. 20, 2011

(65) Prior Publication Data
US 2013/0200641 A1    Aug. 8, 2013

(30) Foreign Application Priority Data

Apr. 15, 2010  (FR) ...................................... 10 52881

(51) Int. Cl.
*B66C 1/54*    (2006.01)
*B66C 1/34*    (2006.01)
*B29D 30/06*   (2006.01)

(52) U.S. Cl.
CPC .............. *B66C 1/34* (2013.01); *B29D 30/0603* (2013.01)

USPC .............................................. 294/97; 425/38

(58) Field of Classification Search
CPC .............. B66C 1/54; B66C 1/56; B66C 1/66; Y10S 414/123; Y10S 414/124; B29D 30/0016; B29D 30/0603
USPC .......................... 294/97, 95, 115, 116; 425/38
See application file for complete search history.

(56) References Cited

U.S. PATENT DOCUMENTS

| 2,264,633 A | 12/1941 | Glynn |
| 3,222,715 A * | 12/1965 | Harris .............................. 425/32 |
| 3,659,975 A | 5/1972 | Leblond |
| 4,236,883 A | 12/1980 | Turk et al. |
| 4,401,422 A * | 8/1983 | Amano et al. ................... 425/38 |
| 5,395,150 A * | 3/1995 | Imler et al. ..................... 294/195 |
| 6,273,670 B1 * | 8/2001 | Henson et al. ............. 414/796.9 |
| 7,841,634 B2 * | 11/2010 | Singh et al. ...................... 294/93 |
| 2009/0295179 A1 | 12/2009 | Michaels |
| 2009/0309379 A1 * | 12/2009 | Hwang, II ...................... 294/104 |
| 2009/0311355 A1 * | 12/2009 | Hineno et al. ................ 425/58.1 |

FOREIGN PATENT DOCUMENTS

| DE | 11 57 769 | 11/1963 |
| JP | 8 039568 | 2/1996 |
| SU | 401 533 | 10/1973 |

* cited by examiner

*Primary Examiner* — Saul Rodriguez
*Assistant Examiner* — Gabriela Puig
(74) *Attorney, Agent, or Firm* — Cozen O'Connor

(57) ABSTRACT

Device for handling (102) a green tire (24), comprises a supporting structure and at least one hook (106) mounted to rotate with respect to the supporting structure between a gripping position and a disengaged position, about a horizontal axis (18) running outside of the hook.

8 Claims, 2 Drawing Sheets

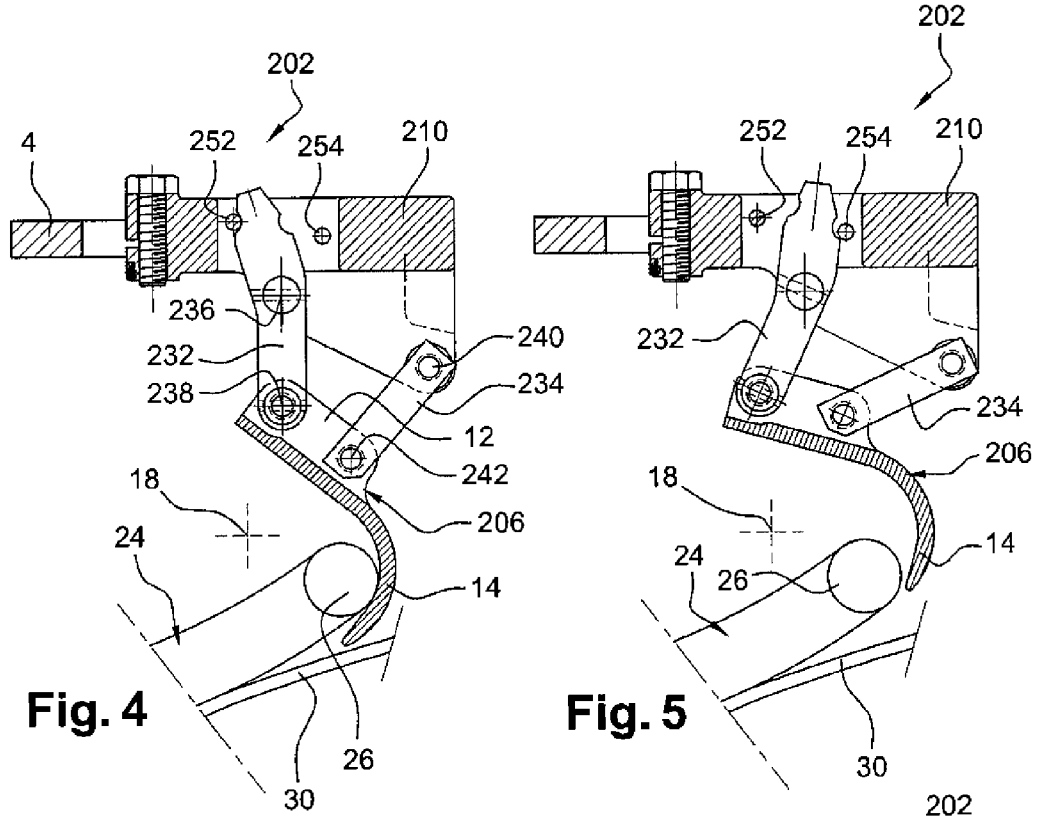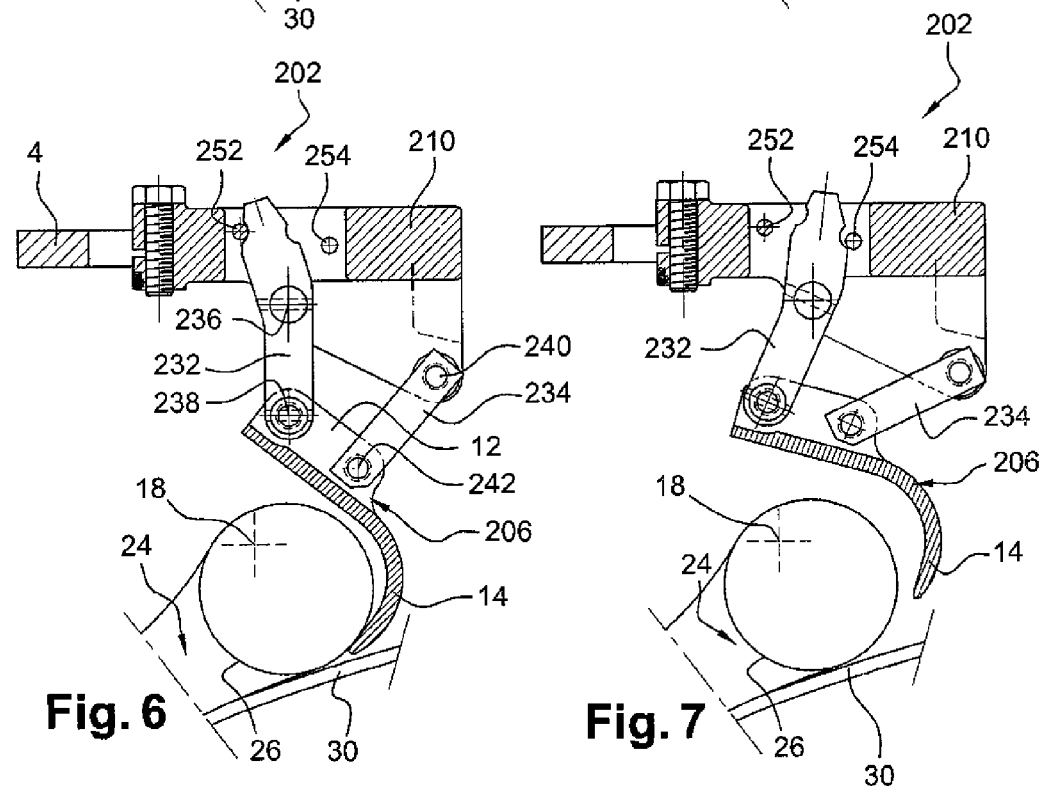

DEVICE AND METHOD FOR HANDLING AN UNCURED TIRE BLANK

RELATED APPLICATIONS

This is a U.S. National Phase Application under 35 USC 371 of International Application PCT/FR2011/050841 filed on Apr. 12, 2011.

This application claims the priority of French application Ser. No. 10/52881 filed Apr. 15, 2010, the entire content of which is hereby incorporated by reference.

The invention relates to the manufacture of vehicle tires and in particular to the handling of uncured or green tires.

BACKGROUND OF THE INVENTION

To manufacture a tire, a green tire is produced which comprises a tire casing made up of rubber. At this stage, the rubber displays broadly plastic behaviour. In order for the material to become elastic, it needs to be vulcanized in a curing press. Given the weight of the green tire and the broadly plastic nature of the material of which it is made, the operation of loading the green tire into the press is a particularly tricky one. To do it, use is made of a device known as a gripper which has hooks. When the green tire is in a horizontal position, the hooks grasp the tire casing via its upper inside diameter in the region of the upper bead. Once the tire casing has been grasped, the gripper introduces the green tire into the curing press so that an inflatable bladder can be deployed inside the tire casing. The bladder then supports the weight of the tire casing and the gripper can withdraw the hooks. It therefore retracts and the press closes so that the operation of vulcanizing the tire casing can begin. Once the tire casing has been vulcanized, a special-purpose gripper extracts it from the press by grasping it via the upper bead using hooks and removes the tire. This extraction operation is not as tricky as the operation of introducing into the mould press because the tire no longer has the plasticity that characterized the material prior to vulcanizing.

However, this technique of grasping the tire casing in order to introduce it into the press has a number of disadvantages. Specifically, the withdrawal of the hooks once the tire casing has been introduced into the press involves pushing down on the top of the bladder which lies in the withdrawal path of the hooks. Now, that can impair the geometry of the tire casing. Further, one of the hooks can sometimes become wedged between the tire casing and the bladder.

SUMMARY OF THE INVENTION

It is an object of the invention to alleviate these disadvantages.

To this end, one aspect of the invention provides a device for handling a green tire, which comprises a supporting structure and at least one hook mounted to rotate with respect to the supporting structure between a gripping position and a disengaged position, about a horizontal axis running outside of the hook.

Thus, the hook can move from the gripping position to the disengaged position while respecting the geometry of the bead of the green tire and without the need to push the top of the bladder down. As a result, the geometry of the tire casing is preserved. Further, this prevents the hook from becoming wedged between the bladder and the tire casing.

In one embodiment, the device comprises at least one circular ramp for guiding the hook.

For preference, the ramp is formed by a groove.

Provision may be made for the hook to be mounted to rotate with respect to a support of the hook about the axis and for the support to be mounted so that it can slide with respect to the supporting structure.

Another aspect of the invention provides a method for handling a green tire, in which at least one hook of a handling device is moved from a gripping position to a disengaged position, or vice versa, the disengaged position being the image of the gripping position through isometry, with respect to a supporting structure of the device, involving a rotation about a horizontal axis which intercepts the green tire.

Thus, the rotation can be carried out both close to the green tire and without harming it.

In one embodiment, the isometry consists of rotation.

It should be pointed out here that that is not, however, a necessity. Indeed the invention can be implemented using an isometry formed by the combination of a translational and of a rotational movement. All that is required is for the rotation to make the movement of disengagement of the hook possible.

Provision may be made for the hook to be moved in a movement consisting of isometry.

Conversely, provision may be made for the hook to be moved in a movement different from isometry.

Note that the fact that the disengaged position is the image of the gripping position as a result of the aforementioned isometry does not mean that the instantaneous movement of the hook from one of these positions to the other consists of this isometry. In other words, the two positions may be in a certain geometric relationship to one another without the instantaneous movement of the hook from one of these positions to the other being entirely determined by this simple fact. Further, depending on the embodiment, this movement may effectively correspond to this isometry or differ therefrom.

In an another embodiment, the device implementing this method comprises two link rods which are able to move relative to one another and which connect the hook to a supporting structure of the device.

For preference, the link rods are connected to the supporting structure by pivot pins mounted such that they cannot move relative to one another.

Advantageously, the link rods are connected to the supporting structure by pivot pins, the pivot pin of the link rod furthest away from a centre of the supporting structure being lower down than the pivot pin of the other link rod.

This then encourages the rotary movement of the hook.

For preference, the device comprises at least one end stop able to limit the travel of one of the link rods.

BRIEF DESCRIPTION OF THE DRAWINGS

Other features and advantages of the invention will become further apparent from the following description of two devices which are given by way of non-limiting examples, with reference to the attached drawings in which:

FIGS. 4 to 7 are views similar to FIGS. 2 and 3 illustrating two other devices.

DETAILED DESCRIPTION OF THE DRAWINGS

Figure 1:
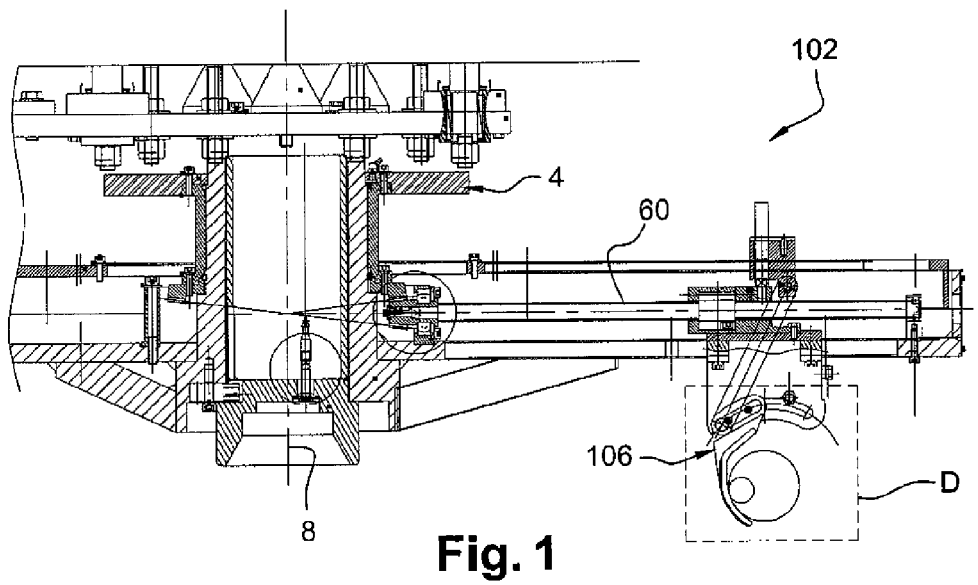
FIG. 1 is a partial view in axial section of a handling device according to one embodiment of the invention.
Figure 2:
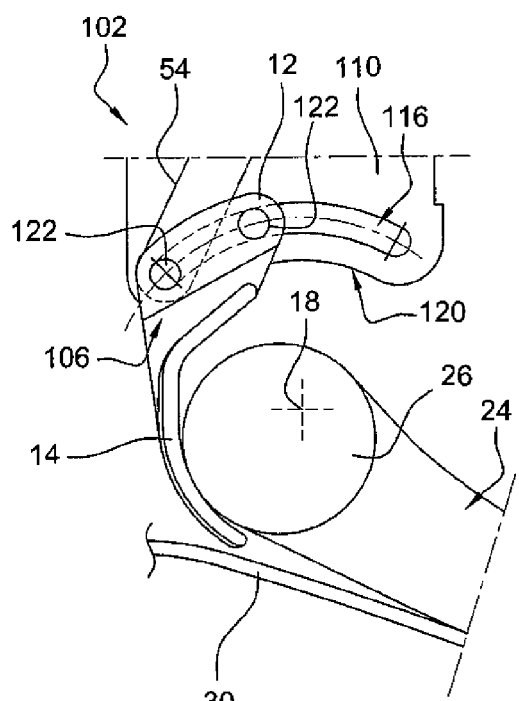
FIG. 2 is a simplified view on a larger scale of detail D of FIG. 1, showing the hook in the gripping position.
Figure 3:
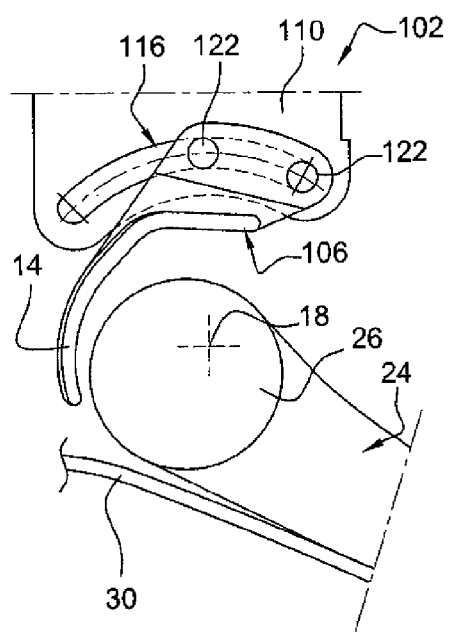
FIG. 3 is a view similar to FIG. 2 showing the hook in the disengaged position.

FIGS. 1 to 3 illustrate an embodiment of a device 102 forming a gripper used for grasping a vehicle green tire. The green tire is to a large extent made of rubber. The invention can be used on green tires for the wheels of vehicles of the light vehicle, heavy goods vehicle, or construction plant type.

The gripper 102 comprises a supporting structure 4 and several hooks 106 supported by the supporting structure. The hooks are evenly distributed about a vertical main axis 8 of the supporting structure. They lie at the same distances from this axis. Only one of the hooks 106 has been illustrated in FIG. 1.

The hook 106 comprises a base 12 bearing a hook free end 14. The latter has a bent curved shape a centre of curvature of which lies on the opposite side of the free end to the axis 8. The tip of the hook therefore faces outwards in the radial direction.

For each hook 106, the supporting structure 4 comprises a support 110 bearing the hook 106. The support 110 comprises a flat wall running in a vertical overall plane radial with respect to the axis 8. In this particular instance it has a groove 116 of circular shape passing through the thickness of the wall and running along the latter. The centre of curvature of the groove is situated beneath this, i.e. on the same side of the groove as the free end 14. The support 110 has a lower edge 120 the curvature of which is similar to that of the overall shape of the groove, making a somewhat kidney bean shape.

The base 12 supports two fingers or studs 122 which occupy a fixed position on the base 12, both being engaged in the groove 116 which acts as a ramp and track for them to guide their movement. The base 12 extends on one side of the wall of the support, in front or behind, the fingers 122 being held captive in the groove.

By virtue of this arrangement, the hook 106 is mounted with the ability to rotate with respect to the support 110 and to the supporting structure 4 about a horizontal axis 18 that passes through the centre of curvature of the groove 116 and is perpendicular to the plane thereof and therefore to the radial plane.

When the hook is in its lowermost position closest to the axis 8, as illustrated in FIG. 2, the hook is in the position known as the gripping position and at the end of its travel finds itself in abutment against the internal end of the groove. Conversely, as illustrated in FIG. 3, in the disengaged position the hook is in its uppermost position furthest away from the axis 8 and in abutment against the outside end of the groove.

The hook 106 is therefore mounted with the ability to move between the gripping position and the disengaged position. The latter is the image of the gripping position through isometry in the vertical plane that is radial with respect to the axis 8, the isometry in this particular instance consisting of a rotation about the horizontal axis 18. The gripping position is the image of the disengaged position by a rotation through the same angle, in the opposite direction, about the same axis. The axis 18 runs outside of the hook.

In addition, from one of the two positions to the other, and regardless of its direction of travel, the hook is given an instantaneous movement that consists of a rotation about this axis. The groove 116 effectively forms a circular track for guiding the hook. Each point of the hook therefore follows the path of an arc of a circle centred on the axis 18.

The gripper is used as follows.

In order to manufacture a tire, a green tire made notably of rubber is produced first of all.

The tire casing 24 thus obtained is laid horizontally with its main axis vertical and the gripper is brought in over the green tire. The hooks 106 are initially in the disengaged position as illustrated in FIG. 3. The gripper is lowered so that the hooks can be inserted level with the upper inside diameter that forms the upper bead 26 of the tire casing. The hooks are then moved into the gripping position illustrated in FIG. 2. During the course of this movement, the end 14 of each hook comes to press on the underside of the bead 26 through a rotational movement about the axis 18. The tire casing is therefore supported at is bead by the hooks. The gripper then picks up the green tire and loads it into the curing press. Therein, an inflatable rubber bladder 30 deploys inside the tire casing 24 and supports the weight thereof. From then on, the hooks can leave the gripping position and return to the disengaged position through a reverse rotational movement. Once they have arrived in this position illustrated in FIG. 3, the gripper can be moved away from the tire casing. The press is then closed and the vulcanizing of the tire casing begins. On completion of vulcanization, the tire is extracted from the press using a special-purpose gripper, being grasped by its top bead 26, and is removed onto a conveyer.

It can be seen that the axis 18 is parallel to the circumferential direction of the tire casing and of the bead. In addition, it extends into the bead during the transition from the disengaged position to the gripping position and vice versa.

In this example, each hook support 110 forms part of equipment mounted such that it can slide with respect to the supporting structure 4 in a horizontal direction radial with respect to the axis 8, in this instance by being fitted onto a linkage or horizontal bar 60 specific to it. Drive means are provided for bringing about this sliding movement of the equipment.

Before a green tire is gripped, the equipment occupies a position relatively close to the axis 8. The gripper is lowered. Once it is in place with respect to the green tire that is to be grasped, the equipments move away from the axis 8 in radial directions in order to bring the hooks closer to the green tire and position them in the disengaged position, prior to moving them into the gripping position as indicated above. Conversely, once the handling of the green tire is over, the hooks in the disengaged position as in FIG. 3 are brought closer to the axis 8 before the gripper is raised.

Another gripper 202 has been illustrated in FIGS. 4 and 5. Again we see the supporting structure 4 and the support 210 for each hook 206. The base 12 thereof this time is connected to the support 210 indirectly by means of two link rods 232, 234 which are able to move relative to one another and each of which connects the hook to the supporting structure 4. The two link rods run in one and the same vertical plane that is radial with respect to the axis 8. The inner link rod 232 at any instant occupies a position closer to the axis 8 than the outer link rod 234. The inner link rod 232 is articulated to the support 210 about an upper pivot pin 236 and to the base 12 about a lower pivot pin 238. The outer link rod 234 is articulated to the support 210 about an upper pivot pin 240 and to the base 12 about a lower pivot pin 242. The four pivot pins 236, 238, 240 and 242 are horizontal and mutually parallel. The two pivot pins 236, 240 are supported by one and the same component of the support 210 and therefore occupy positions that cannot move relative to one another. The two pivot pins 238 and 242 supported by the base 12 also occupy positions that cannot move relative to one another. The pivot pin 236 always runs at a higher height than the pivot pin 240. The same is true of the pivot pin 238 with respect to the pivot pin 242.

As before, the hook can occupy a gripping position and a disengaged position which positions are illustrated respectively in FIGS. 4 and 5. Once again, the disengaged position is the image of the gripping position through an isometry in the radial vertical plane, and vice versa. This isometry in this instance likewise consists of a rotation about a horizontal axis 18 situated on the same side of the free end of the hook as the centre of curvature of this hook and situated outside the hook.

In contrast with the device 102, the axis 18 does not directly correspond to the geometry of one of the components as it did in the case of the curvature of the groove 116. In addition, this time, as it moves from one of these two positions into the other, the hook is given an instantaneous movement which differs from this rotation. Specifically, each of the link rods itself effects a rotational movement about its respective upper pivot pin 236, 240. The other pivot pin of each of the link rods, the pivot pin attached to the hook, can therefore have no axis of rotation other than the aforementioned pivot pin. Thus, the pivot pin 238 follows a movement of rotation about the pivot pin 236. The same is true of the pivot pin 242 with respect to the pivot pin 240. As a result, in this instance, the isometry which allows one of the positions to be the image of the other does not correspond to the instantaneous movement followed by the hook. Each point of the hook does not therefore have as its instantaneous path an arc of a circle centred on the axis 18.

This gripper is used in the same way as the previous one. The device is arranged in such a way that the axis 18 is situated outside of the bead when the device is in use.

In this particular instance, two end stops 252, 254 are provided on the support 210 and serve to limit the travel of the link rod 232 and thus to define the ends of the travel of the hook which correspond to the gripping position and to the disengaged position.

The device illustrated in FIGS. 6 and 7 is similar in its construction to that of FIGS. 4 and 5 except that this time the axis of rotation 18 intercepts the bead of the green tire and is therefore situated within the cross section thereof like the axis 18 in FIG. 2. This change in position of the axis with respect to the previous device may be the result of a change in size or shape of the bead and/or of a change in size or configuration of the device.

In all three examples, an operating member 54 allows the hook to be moved. This member may be formed by the link rod 232 in the second example.

In these examples, when the product is being gripped or released, the hooks rotate about the bead 26 in order not to damage either the latter or the curing bladder. There is no need for the top of the bladder 30 to be pushed down in order to withdraw the hooks upon disengagement. As a result, the geometry of the tire casing is conformed to better when the green tire is being fitted into the press. In addition, there is no risk of the hooks becoming wedged between the bladder 30 and the tire casing 24. As a result, the invention is also able to reduce the time taken to load the product into the press and unload it therefrom. The invention allows the tire casings to be handled without the risk of deforming them or impairing their geometry.

Of course, the invention could be modified in numerous ways without departing from its scope.

Provision could be made for the isometry not to be reduced to a rotation and to be formed of a combination of a translational and of a rotational movement, or vice versa, such an isometry likewise comprising a component of movement that is rotating about the bead 26.

Provision could be made, when the overall movement of the hook from the gripping position to the disengaged position is not a rotation, for its instantaneous movement over at least part of this path to be formed of a rotation the axis of which varies, for example at each moment, and for this variable, or even instantaneous, axis to run, at least once during the path, outside of the hook and notably in the bead of the green tire.

The invention claimed is:

1. A device for handling a green tire, comprising a supporting structure and at least one hook mounted exclusively to rotate with respect to a support connected to the supporting structure between a gripping position and a disengaged position, about a horizontal axis running outside of the hook, the hook having a tip oriented in the opposite direction to a main axis of the supporting structure.

2. The device according to claim 1, which comprises at least one circular ramp for guiding the hook.

3. The device according to claim 2, wherein the ramp is formed by a groove.

4. The device according to claim 1, wherein the support is mounted so that it can slide with respect to the supporting structure.

5. A method for handling a green tire, wherein at least one hook of a handling device is moved from a position in which the green tire is gripped by the hook to a position in which the hook is disengaged from the green tire or vice versa, the disengaged position being the image of the gripping position through at least one rotation, or both at least one rotation and at least one translation, with respect to a supporting structure of the device, involving a rotation about a horizontal axis which intercepts the green tire at a point situated in a plane of rotation of the hook.

6. The method according to claim 5, wherein the disengaged position is the image of the gripping position through the at least one rotation.

7. The method according to claim 5, wherein the hook is moved between the position in which the green tire is gripped by the hook and the position in which the hook is disengaged from the green tire through a movement consisting of the at least one rotation, or both the at least rotation and the at least one translation.

8. The method according to claim 5, wherein the hook is moved between the position in which the green tire is gripped by the hook and the position in which the hook is disengaged from the green tire through a movement different from the at least one rotation, or both the at least rotation and the at least one translation.

* * * * *